(12) United States Patent
Fleischer et al.

(10) Patent No.: US 10,900,817 B2
(45) Date of Patent: Jan. 26, 2021

(54) SENSOR SYSTEM AND METHOD FOR PRODUCING A SENSOR SYSTEM

(71) Applicant: Robert Bosch GmbH, Stuttgart (DE)

(72) Inventors: Sven Fleischer, Oetisheim (DE); Joachim Domat, Zaisenhausen (DE); Robert Remus, Mundelsheim (DE); Ralf Walcher, Sonthofen (DE); Martin Winkler, Sonthofen (DE); Stephan Knackert, Haldenwang (DE); Rainer Gumpinger, Rettenberg Altach (DE); Bernd Lutz, Kempten (DE); Michael Rambow, Durach (DE)

(73) Assignee: Robert Bosch GmbH, Stuttgart (DE)

( * ) Notice: Subject to any disclaimer, the term of this patent is extended or adjusted under 35 U.S.C. 154(b) by 114 days.

(21) Appl. No.: 16/309,515

(22) PCT Filed: May 31, 2017

(86) PCT No.: PCT/EP2017/063157
§ 371 (c)(1),
(2) Date: Dec. 13, 2018

(87) PCT Pub. No.: WO2017/215917
PCT Pub. Date: Dec. 21, 2017

(65) Prior Publication Data
US 2019/0128708 A1    May 2, 2019

(30) Foreign Application Priority Data

Jun. 14, 2016    (DE) .......................... 10 2016 210 519

(51) Int. Cl.
*G01D 11/24*    (2006.01)
*G01D 11/30*    (2006.01)

(52) U.S. Cl.
CPC .......... *G01D 11/245* (2013.01); *G01D 11/24* (2013.01); *G01D 11/30* (2013.01)

(58) Field of Classification Search
CPC .................................................. G01D 11/245
See application file for complete search history.

(56) References Cited

U.S. PATENT DOCUMENTS 5,241,910 A * 9/1993 Cunningham ...... B60R 21/2644
                                                              102/202.2
5,631,556 A * 5/1997 Shibata ................ G01D 11/245
                                                              29/607

(Continued)

FOREIGN PATENT DOCUMENTS

DE    38 27 937 A1    2/1990
DE    42 34 133 A1    4/1994

(Continued)

OTHER PUBLICATIONS

International Search Report corresponding to PCT Application No. PCT/EP2017/063157, dated Sep. 5, 2017 (German and English language document) (5 pages).

*Primary Examiner* — Paul M. West
*Assistant Examiner* — Mark A Shabman
(74) *Attorney, Agent, or Firm* — Maginot, Moore & Beck LLP

(57) ABSTRACT

A sensor arrangement has a support component, a sensor element with at least two terminals, at least two plug contacts and at least two connection elements for electrically connecting the connection elements to the control contacts. The support component receives the sensor element with at least two terminals and the at least two plug contacts. Connection elements are positioned and spaced apart from one another in the support component by means of spacer (Continued)

elements and separator elements. The disclosure also relates to a corresponding production method.

17 Claims, 5 Drawing Sheets

(56) References Cited

U.S. PATENT DOCUMENTS

| | | | | |
|---|---|---|---|---|
| 5,883,383 | A * | 3/1999 | Dragne | A01C 7/105 250/222.2 |
| 6,683,450 | B2 * | 1/2004 | Rick | G01D 11/245 174/840 |
| 6,883,383 | B2 | 4/2005 | Alznauer et al. | |
| 7,722,362 | B2 * | 5/2010 | Frake | B29C 45/14639 439/76.1 |
| 8,092,234 | B2 * | 1/2012 | Friedhof | H01R 13/6683 439/76.1 |
| 2007/0001664 | A1 * | 1/2007 | Steinbrink | G01P 1/026 324/174 |
| 2007/0057665 | A1 * | 3/2007 | Borst | G01D 11/245 324/207.2 |
| 2008/0026610 | A1 | 1/2008 | Frake et al. | |
| 2008/0198559 | A1 * | 8/2008 | Mueller | H01R 13/6658 361/728 |
| 2011/0273165 | A1 * | 11/2011 | Palassis | G01D 11/00 324/149 |
| 2014/0352461 | A1 * | 12/2014 | Panis | B29C 45/14336 73/866.5 |
| 2015/0316393 | A1 * | 11/2015 | Lucchi | G01D 5/145 92/5 R |

FOREIGN PATENT DOCUMENTS

| | | |
|---|---|---|
| DE | 43 05 439 A1 | 8/1994 |
| DE | 196 10 167 C1 | 2/1997 |
| DE | 196 18 631 A1 | 11/1997 |
| DE | 297 18 790 U1 | 2/1998 |
| DE | 20 2005 006 846 U1 | 10/2006 |
| DE | 20 2005 013 344 U1 | 12/2006 |
| DE | 20 2007 012 370 U1 | 12/2007 |
| DE | 20 2006 018 019 U1 | 4/2008 |
| DE | 10 2007 001 445 A1 | 7/2008 |
| DE | 10 2008 043 169 A1 | 4/2010 |
| DE | 20 2007 018 962 U1 | 5/2010 |
| DE | 10 2009 026 436 A1 | 12/2010 |
| DE | 10 2009 028 963 A1 | 3/2011 |
| DE | 10 2012 212 346 A1 | 1/2014 |
| DE | 10 2012 012 527 A1 | 3/2014 |
| EP | 1 446 643 B1 | 8/2004 |
| EP | 2 607 859 A2 | 6/2013 |
| JP | H01-217231 A | 8/1989 |
| JP | 2001-249142 A | 9/2001 |
| JP | 2006-030075 A | 2/2006 |
| JP | 2007-523336 A | 8/2007 |
| JP | 2010-521695 A | 6/2010 |
| JP | 2010-530541 A | 9/2010 |
| JP | 2013-174582 A | 9/2013 |
| JP | 2015-501743 A | 1/2015 |
| WO | 2005/025015 A1 | 3/2005 |

* cited by examiner

SENSOR SYSTEM AND METHOD FOR PRODUCING A SENSOR SYSTEM

This application is a 35 U.S.C. § 371 National Stage Application of PCT/EP2017/063157, filed on May 31, 2017, which claims the benefit of priority to Serial No. DE 10 2016 210 519.1, filed on Jun. 14, 2016 in Germany, the disclosures of which are incorporated herein by reference in their entireties.

The disclosure relates to a sensor arrangement and to a production method for a sensor arrangement having the features of the following description.

BACKGROUND

Published patent application DE 10 2009 028 963 discloses a connector arrangement for a sensor arrangement having a connector element, which, in a first contact-connection region, is electrically and mechanically connected to an end of at least one conductor of a connector cable and, in a second contact-connection region, can be electrically and mechanically connected to a sensor element. The connector element is in this case at least partly encased by a plastic overmold.

SUMMARY

The sensor arrangement according to the disclosure comprises a holder component, a sensor element having at least two connector elements, at least two plug contacts, and at least two connecting elements for the electrical connection of the connector elements to the plug contacts. The holder component is configured to receive the sensor element having at least two connector elements, and to receive the at least two plug contacts. At least one spacing element from at least one wall of the holder component and at least one separator element are formed on the holder component. The at least two connecting elements can be spaced apart in relation to the at least one wall by means of the at least one spacing element. The connecting elements can be spaced apart with respect to one another by means of the at least one separator element. The sensor arrangement having a holder, which has receptacles for the sensor element, plug contacts and connecting elements, permits simple and accurate positioning of the components built into the sensor. And the electrical connection thereof. Connecting elements can be understood to mean conductor ribbons, which, when they are intended to be connected to the connectors of the actual sensor element and to the plug contacts, can be easily inserted into the holder and be positioned and/or led through the spacing elements and the separator elements. Separation of the connecting elements, for example of the conductor ribbons, prevents electrical undesired instances of electrical contact between the connecting elements.

The method for producing a sensor arrangement comprises the step of producing a holder component, which has a receptacle for two plug contacts of a plug component. The holder component also has a receptacle for a sensor element having at least two connector elements. The holder component furthermore has at least one spacing element from at least one wall of the holder component. The holder component likewise has at least one separator element.

At least two connecting elements, which can be provided for the electrical connection of the connector elements to the plug contacts, can be spaced apart in relation to the at least one wall by means of the at least one spacing element. Said connecting elements can be spaced apart with respect to one another by means of the at least one separator element.

The production method also comprises the step of producing a plug component, which has at least two plug contacts. In the production method, the holder component and the plug component are also positioned with respect to one another, wherein the plug contacts are introduced into an interior of the holder component as a result.

Advantageous configurations of the sensor arrangement and of the method for producing a sensor arrangement can be found in the following description.

It is advantageous that the holder component and the at least one spacing element and the separator element are produced in one piece. A one-piece production of the holder component with spacing element and separator element can have the advantage that, in a first manufacturing step, positioning aids are provided in the holder component, which positioning aids arranges the components to be received appropriately, and aligns running electrical connections, leads them in a manner separated from one another and stabilizes them for subsequent processing steps.

The plug contacts are advantageously mechanically connected to a plug component and are introduced into an interior of the holder component through an opening in a wall of the holder component.

The plug contacts are advantageously introduced into the interior through the positioning of the plug component and the holder component with respect to one another.

In one configuration of the sensor arrangement, between the connector elements and the plug contacts, there is an offset within the holder component, which offset is balanced by the connecting elements. The connecting elements are led through the at least one spacing element and the at least one separator element—at least partially—along the offset. The connecting elements used can advantageously be conductor ribbons, which are flexible and which due to their flexibility balance the offset of the connector elements and the plug contacts during assembly of the sensor, in particular during insertion of the conductor ribbons, and adapt.

It is also advantageous that the plug component is connected to the holder component, as a result of which the introduced plug contacts are secured in the interior of the holder component. By connecting the plug component and the holder component, an alignment of the plug contacts in the holder component, where the plug contacts are also intended to be contact-connected, is therefore prescribed and fixed.

In one configuration of the production method, the holder component and the plug component are secured in a manner positioned with respect to one another, as a result of which the position of the plug contacts in the interior of the holder component is fixed.

In a subsequent step, the sensor element is introduced into the holder component and the connector elements of the sensor element are positioned thereby. An alignment of the sensor element and of the associated connector elements is therefore advantageously possible.

In one configuration of the production method, the already positioned connector elements are electrically conductively connected to the secured plug contacts by virtue of the connecting elements being inserted into the holder component and the connecting elements each being electrically conductively connected to the corresponding plug contacts and to the corresponding connector elements. The connecting elements are positioned by means of the at least one spacing element. The connecting elements are separated from one another by means of the at least one separator element. Due to the possibility of performing the electrical connection only when the plug contacts and the connector elements are already positioned in the holder component, it is possible to balance tolerances that occur in the production of the sensor. On account of their flexibility, conductor ribbons as connecting elements make easy balancing possible since they adapt their shape to the necessary course in the holder component.

In an advantageous configuration, the interior of the holder component is filled with a sealing compound, wherein the sealing compound encloses in sealing fashion at least the sensor element having the connector elements, the plug contacts, the at least at a contact-connection region with respect to the connecting elements, and the connecting elements. The introduction of a sealing compound, for example composed of silicone, makes it possible to protect the inbuilt component parts in the preassembled state. The component parts to be sealed are advantageously aligned, for example by the corresponding receptacles and securing parts of the holder component, the at least one present separator element and by the at least one spacing element. The filling with sealing compound therefore does not jeopardize the already performed positioning of the components (plug, sensor element and conductor ribbons) with respect to one another.

In an advantageous configuration, the sealing compound seals the passage opening of the holder component. Additional sealing in the connecting region between the holder and the plug is therefore no longer required, since the sealing process in the interior also concomitantly undertakes the sealing of the connecting region.

In an advantageous configuration, a protective film is applied onto the holder component, by way of which protective film the sealing compound is at least partially covered. The sealing compound can therefore be protected against environmental influences and mechanical effects.

It is also advantageous that the connecting elements are flexible and, during the production step of insertion, adapt their shape to an offset of the connector elements and the plug contacts in the holder component.

As already illustrated, tolerances can be balanced easily in this way.

It is also advantageous that the shape of the flexible connecting elements after installation is influenced during insertion by at least one spacing element and/or at least one separator element. The desired course of the connecting elements within the holder can thus be influenced or even prescribed.

The sensor arrangement and the production method have the advantage that different plug variants having different holder variants can be combined in one sensor manufacturing process. The use of flexible conductor ribbons for the connection makes it possible to adapt the electrical connection easily to the installation requirements prescribed by the plug and the holder.

DETAILED DESCRIPTION

Figure 1:
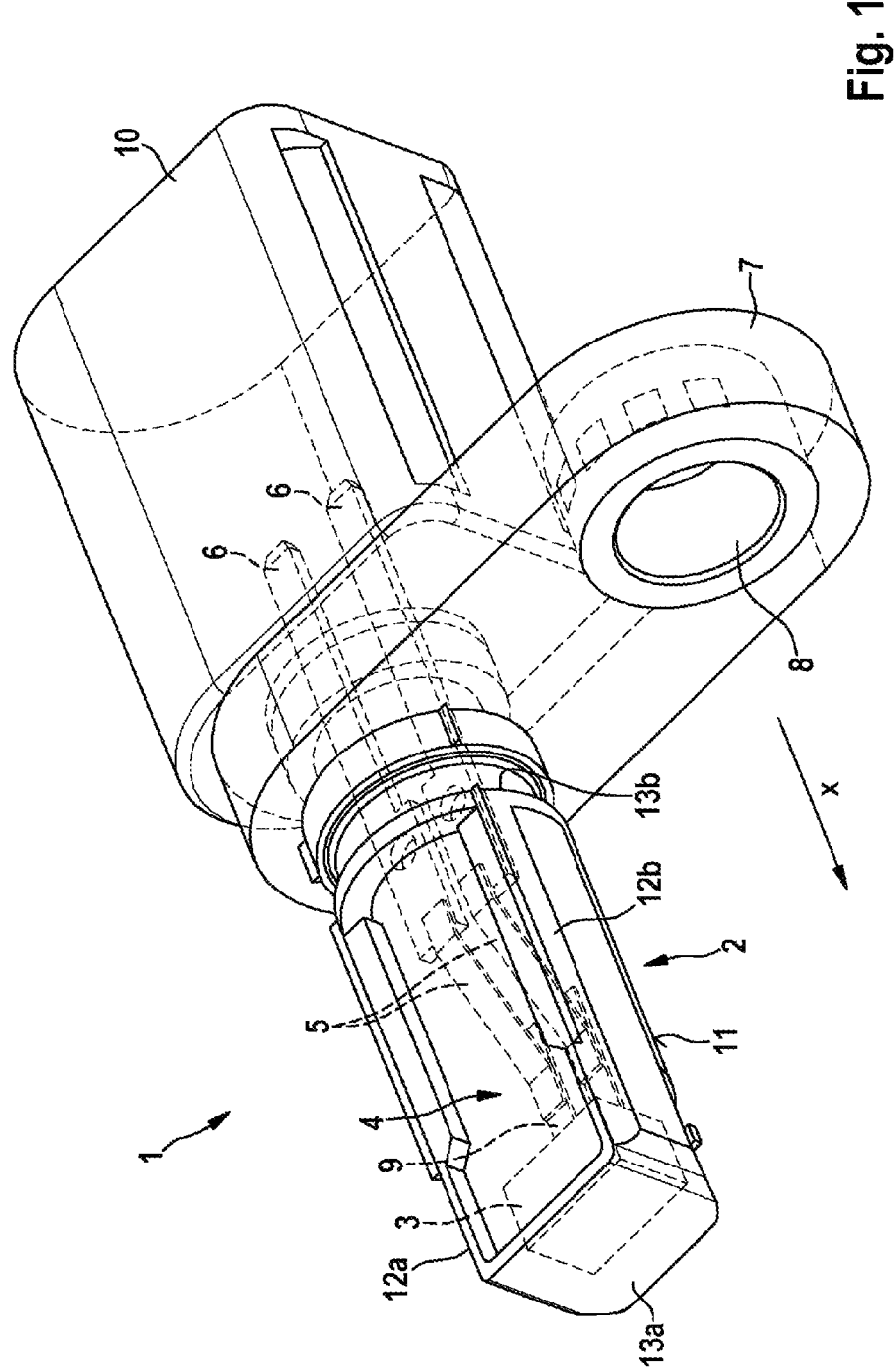
FIG. 1 shows a sensor arrangement.

One embodiment of the disclosure is shown in FIG. 1. The sensor 1 comprises a holder 2, a fastening component 7 and a plug housing 10.

The plug housing 10 can receive a connector cable (not shown), which transmits sensor signals of the sensor 1 to other electronic components. The geometry of the plug housing 10 can be adapted accordingly to the cable geometry.

The fastening component 7 serves to fasten the sensor to further components. To this end, the fastening component can be present in the form of a lug 7, which has a bushing 8. A fastening element (not shown), for example a screw or a bolt, can be passed through the bushing 8 in order to secure the fastening of the sensor 1 to further components in a known manner.

The sensor 1 furthermore comprises a holder 2. The holder 2 is in the form of a trough. The trough shape of the holder 2 is formed by a base 11, two side walls 12a, 12b, a front wall 13a and a rear wall 13b.

The base 11, the side walls 12a, 12b, the front wall 13a and the rear wall 13b delimit an interior 4 of the holder 2.

The holder 2 can receive at least one sensor element 3. The actual measurement values of the sensor 1 are captured by means of such a sensor element 3. A sensor element 3 can be understood to mean, for example, an ASIC. The sensor element 3 in this case has at least one connector contact 9 for the electrical contact-connection of the sensor element 3. The holder 2 can have a positioning structure, which makes it possible to receive the sensor element 3 in the holder 2. Such a positioning structure can be designed as an—at least partial—complement to the sensor element 3 and can receive same with precise fitting. The positioning structure can receive the sensor element 3 and/or the at least one connector contact 9 along the respective circumference.

Sensor signals of the sensor 1, more precisely of the sensor element 3, have to be able to be conducted away therefrom and reach the plug component 10, where the sensor signals are passed on.

The sensor 1 has at least one plug pin 6, which can lead electrical signals from the interior 4 of the holder 2 through the rear wall 13b. Such a plug pin 6 consists of a conductive material.

Figure 5:
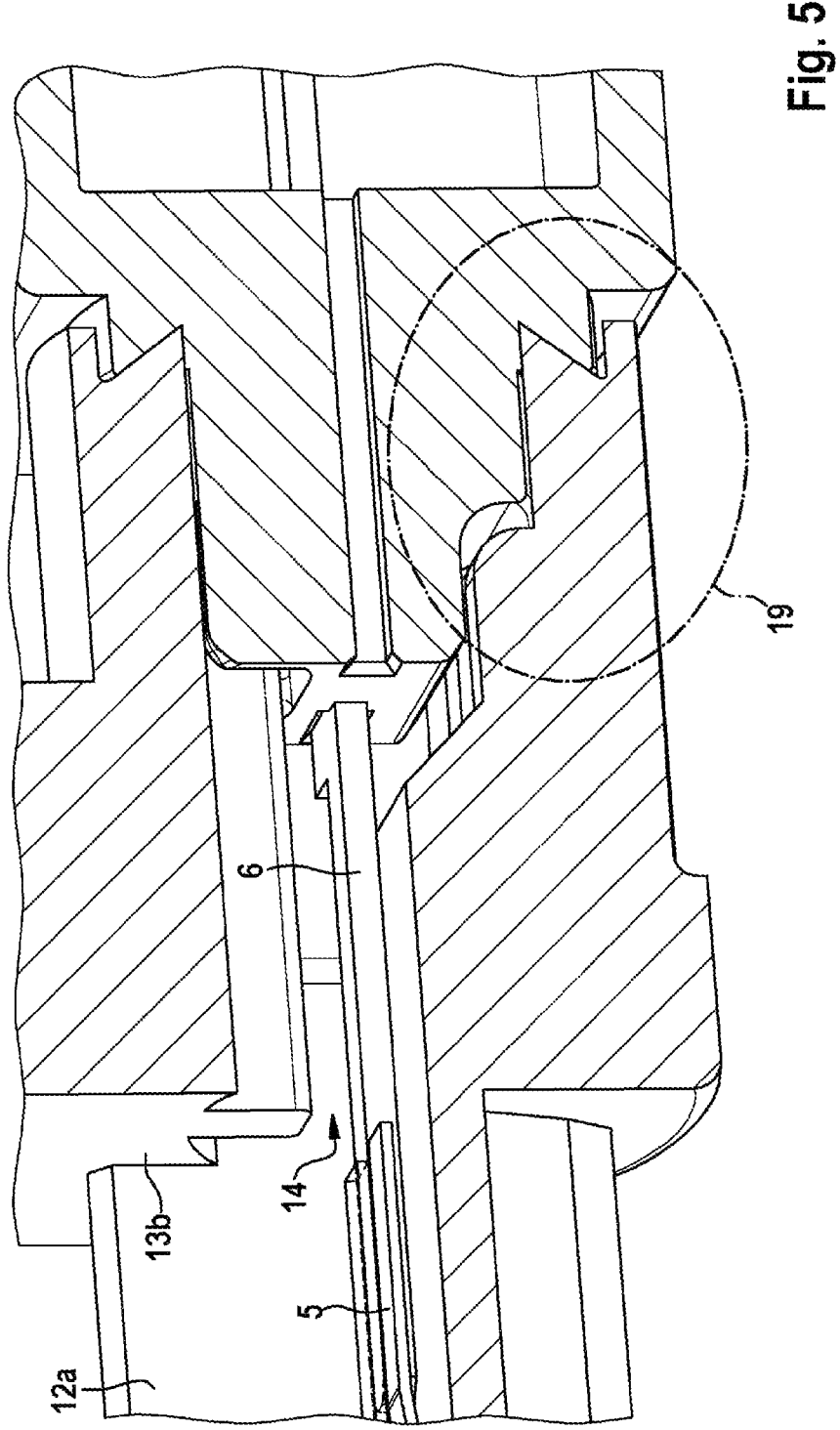
FIG. 5 shows a cross section of a further part of the sensor arrangement.

The plug pin penetrates the rear wall 13b of the holder. One possibility for penetrating the rear wall 13b is also illustrated in FIG. 5. The rear wall 13b has an opening 14, through which a plug pin 6 is led from outside of the holder 2 into the interior 4 of the holder 2.

The plug pin 6 can simultaneously produce the contact for the connector cable in the plug component 10.

To connect the sensor element 3, more precisely the connector contact 9 of the sensor element 3, to the plug pin 6, the sensor 1 provides at least one conductor ribbon 5, which electrically conductively connects the connector contact 9 and the plug pin 6. The conductor ribbon 5 is provided from an electrically conductive material. The respective ends of the conductor ribbon 5 are conductively contact-connected and secured on the one side to the plug pin 6 and on the other side to the connector contact 9 of the sensor element 3.

Figure 2:
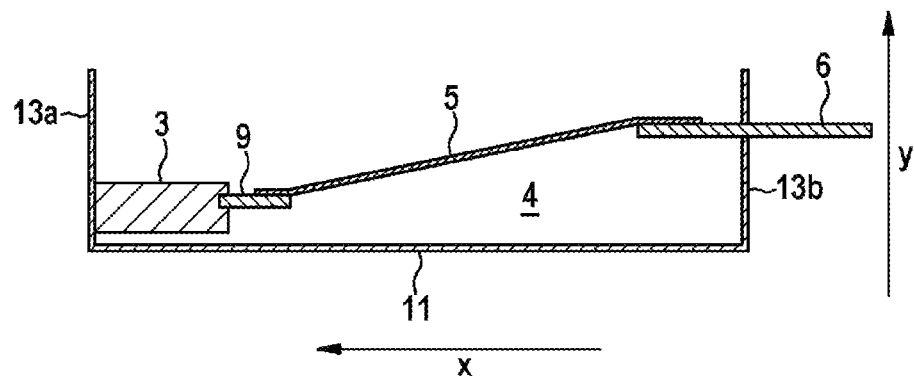
FIG. 2 shows a cross section of a sensor arrangement.
Figure 3:
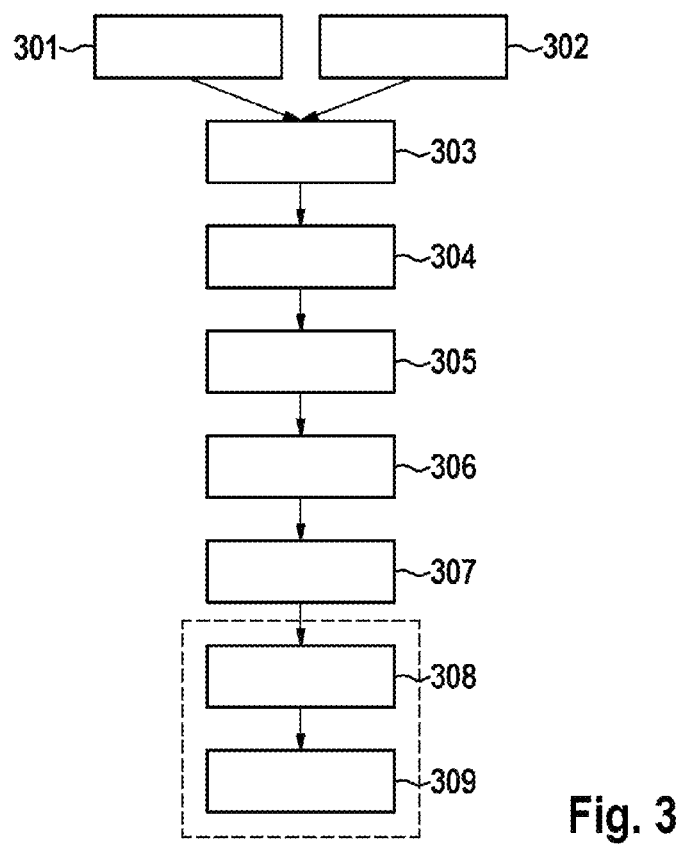
FIG. 3 shows a flow chart of a production method.

FIG. 2 shows a cross section of the holder 2 in the direction of the line indicated in FIG. 1 as x. Identical elements are indicated in FIG. 2 by identical reference signs.

There may be an offset present between the connector contact 9 and the plug pin 6. Such an offset can be present in the direction indicated by y in FIG. 2.

In the case illustrated in FIG. 2, the plug pin 6 is arranged in a manner offset upward with respect to the connector contact 9. The electrical connection between the connector contact 9 and the plug pin 6 has to balance such an offset.

The conductor ribbon 5 is of elastic form. Elastic is to be understood to mean that the conductor ribbon 5 is not a rigid component but instead can be deformed. The deformable conductor ribbon 5 can be adapted to the present offset between the connector contact 9 and the plug pin 6. If a conductor ribbon 5 in the correct length and flexibility to the present sensor geometry is used, a present offset can be easily balanced thereby. One possible material for this is a copper alloy, for example CuSn6. Other materials are possible as long as they are electrically conductive and sufficiently flexible. In an alternative designation, the conductor ribbon 5 can also be referred to as flexible.

In the previous depictions, reference has been made to only one plug pin 6, one conductor ribbon 5 and/or one connector contact 9 for the sake of simplicity. As can be seen in FIG. 1, however, generally at least one of these elements is present, in particular two connector contacts 9, two plug pins 6 and two conductor ribbons 5.

Figure 4:
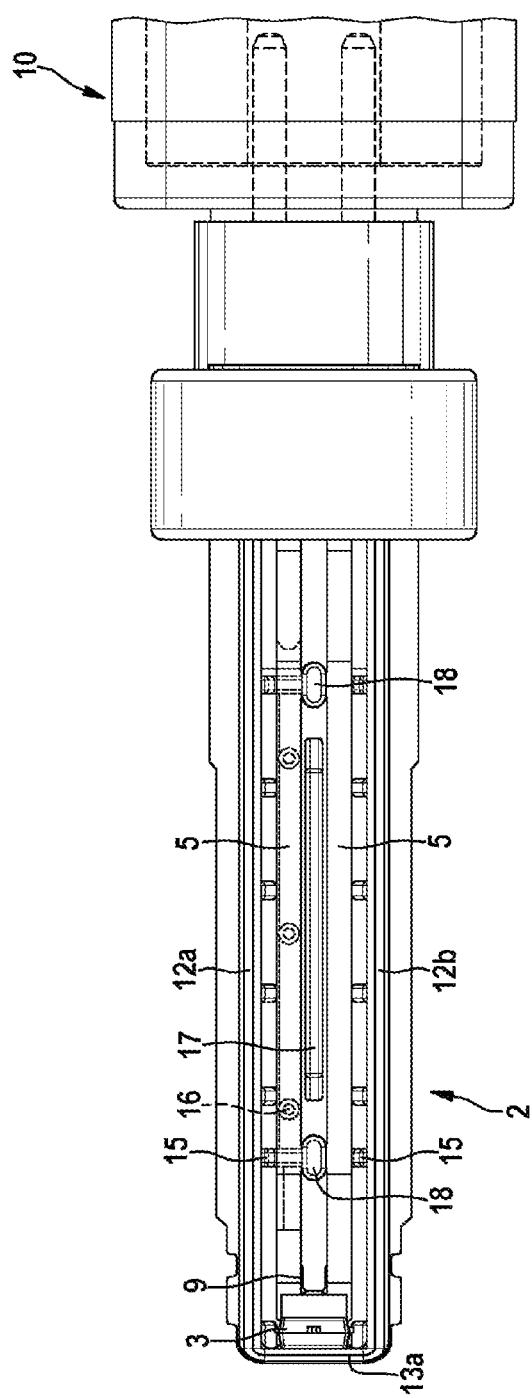
FIG. 4 shows a top view of a part of the sensor arrangement.

FIG. 4 shows a view of the sensor 1 from above. The conductor ribbons 5 connect the connector contacts 9 of the sensor element 3 to the plug pins 6. The conductor ribbons 5 run in the interior 4 of the holder 2 and balance an offset between the plug pins 6 and the connector contacts 9.

The holder 2 has course aids, which ensure a desired course of the conductor ribbons 5 in the interior 4 of the holder 2.

At least one bearing point 15 is located in each case on the side walls 12a, 12b of the holder. The bearing point 15 serves to space at least one conductor ribbon 5 apart from the respective adjacent side wall 12a or 12b. A bearing point has an extent in height of the holder 2—corresponding to the y direction from FIG. 2. Said bearing point prevents a conductor ribbon 5 from coming too close to the side wall 12a, 12b of the holder. The extent in the y direction of the holder 2 of the bearing point 15 can in this case be adapted to the respective present height of the course of the conductor ribbon 5 over the base 11 of the holder 2, since, as described, the conductor ribbon 5 can balance an offset in the y direction between the connector contact 9 and the plug pin 6 and can therefore change its height along its course in the interior 4 of the holder 2.

The holder 2 also has at least one mandrel 18, which is arranged in the center of the holder. The mandrel 18 also has a sufficient extension in the y direction as already described in the case of the bearing points 15.

A spatial isolation of two conductor ribbons 5 can be ensured by means of the mandrel 18. Isolation of the conductor ribbons is necessary to prevent an electrical short between the conductor ribbons 5.

The mandrel 18 can be deformed to secure the conductor ribbons 5 in the holder 2. A deformation is to be understood to mean that the mandrel 18 is enlarged in terms of its dimensions in an upper region apart from the base 11 of the holder 2. In the case of enlargement of the dimensions, a covering of the conductor ribbons 5 is created by the mandrel 18. Due to the covering, the conductor ribbon 5 is pressed against a corresponding support face and secured thereby. A corresponding support face can be, for example, a support point 16 described further below or a similar structure, which is formed on at least one wall 11, 12a, 12b of the holder 2.

As an alternative or in addition to at least one mandrel 18, a partition wall 17 can also be provided between two conductor ribbons 5. A partition wall 17 also has to have a sufficient extension in the y direction of the holder 2 in order to ensure an isolation of the conductor ribbons 5.

The holder can also have at least one support point 16 per conductor ribbon 5, which support points ensure spacing of the respective conductor ribbon 5 apart from the base 11 of the holder 2.

The support points 16 per conductor ribbon can have a non-planar surface at the top end—facing away from the base 11 of the holder 2. A non-planar surface can be a point, a pyramid or a rounded face.

The bearing points 15, support points 16, the mandrels 8 and, where applicable, the partition wall 17 can be understood as separators. The separators make it possible to space the conductor ribbons 5 present in the sensor 1 apart from respective adjacent elements, for example from a further conductor ribbon 5, an adjacent wall 12a, 12b, or from the base 11.

As described further below, the production of the sensor 1 comprises sealing of the interior 4 by way of filling same with a filling compound, for example with silicone. If the conductor ribbons are present in a manner spaced apart from the other elements such as the further conductor ribbon 5, an adjacent wall 12a, 12b, or from the base 11, it is thus ensured that the filling compound seals the interior 4 sufficiently. By spacing the conductor ribbon 5 apart from the base 11, the region therebetween can thus be achieved easily with filling compound. The smallest possible support face can likewise be ensured by way of a point, pyramid or rounding at the top side of the support point 16 against which the conductor ribbon 5 bears, in order to achieve the greatest possible contact between the conductor ribbon 5 and the surrounding silicone, and consequently to optimize the sealing function.

The sensor 1 according to the disclosure is produced by means of a production method according to the disclosure. One embodiment of the production method is described in the following text.

The holder 2 is formed in a first step 301. The holder 2 is produced as an injection-molded component. The holder 2 in this case also has a passage opening 14, as can be seen in FIG. 5, through which the plug pins 6 can reach the interior 4 and be conductively connected there to the conductor ribbons 5, and consequently also to the connector contacts 9 of the sensor element 3. After this production step, the holder 2 also has the necessary separators, that is to say the bearing points 15, support points 16, the mandrels 18 and, where applicable, also the partition wall 17. It must be pointed out that the precise configuration of the separators, in particular the number, positioning or embodiment thereof (for example as a mandrel 18 and/or wall 17) may vary.

The passage opening 14 of the holder 2 shown in FIG. 5 can also have an extent in the direction of the plug pin led through, which extent is larger than is necessary in order to slide the plug pins in through the passage opening. In this way, silicone compound, that is to say filling compound, from the interior 4 can also reach the region in which the plug pins are led through the rear wall 13b of the holder 2.

The plug 10 is formed in a further step 302. The plug is formed in step 302 by virtue of a housing the plug pins 6 being connected to a housing. The plug pins 6 can in this case be pressed into a preformed opening of the housing. It is likewise possible to injection-mold the plug pins 6 in an injection-molding process so that the housing of the plug 10 receives and secures the plug pins 6.

The holder 2 and the plug 10 together with the plug pins 6 form two intermediate components in the production method.

The two intermediate components 2, 10—the plug 10 having the plug pins 6 and the holder 2—are plugged together in a step 303.

When the holder 2 and the plug 10 are plugged together, the at least one plug pin 6 is pushed through the rear wall 13b of the holder 2. The pin 6 consequently reaches the interior 4 of the holder 2. As already depicted, the holder 2 has an opening 14 for this purpose, which opening can be seen in FIG. 5. During plugging together, it can be provided that complementary structures of the plug 10 and of the holder 2 can enter into engagement with one another. In this way, the mechanical strength of the connection of the two components to one another can be increased. Such engagement is highlighted by way of example in FIG. 5 as an engagement region 19. It may be important to position the plug 10 and the holder 2 in a certain preferred orientation with respect to one another. Said preferred orientation can also be achieved by way of a corresponding complementary structure of the two intermediate components 2 and 10. A complementary structure can be provided, for example, in the form of a groove and tongue structure. It is likewise conceivable that the components—holder 2 and plug 10—are latched with respect to one another.

The intermediate components—holder 2 and plug 10—are connected to one another in a subsequent step 304. This can take place by means of ultrasonic welding. Use of other connecting technologies is possible.

The actual sensor element 3 is inserted into the holder 2 in a further step 305, wherein the sensor element 3 has the connector contacts 9 already mentioned.

In the present intermediate state after the connection of the plug 10 to the holder 2 and after the insertion of the sensor element 3 into the holder 2, the respective ends of the plug pins 6 and of the connector contacts 9 are now located in the interior 4 of the holder 2, but these are not yet electrically contact-connected.

For the electrical contact-connection of the connector contacts 9 to the respective plug pins 6, the conductor ribbons 5 are placed in the holder 2 in method step 306 by virtue of them being introduced, in particular being inserted, at the appropriate length. In this case, the correct spacing apart from the side walls 12a, 12b, the base 11 and the conductor ribbons 5 with respect to one another takes place by means of the separators 15, 16, 17 and/or 18. The contact-connection is completed by virtue of the conductor ribbons 5 being welded in a manufacturing step 307 ribbons to the connector contacts 9 and to the plug pins 6.

In a subsequent step 308, the interior 4 is filled with filling compound in order to seal said interior. This can take place using silicone.

Figure 6:
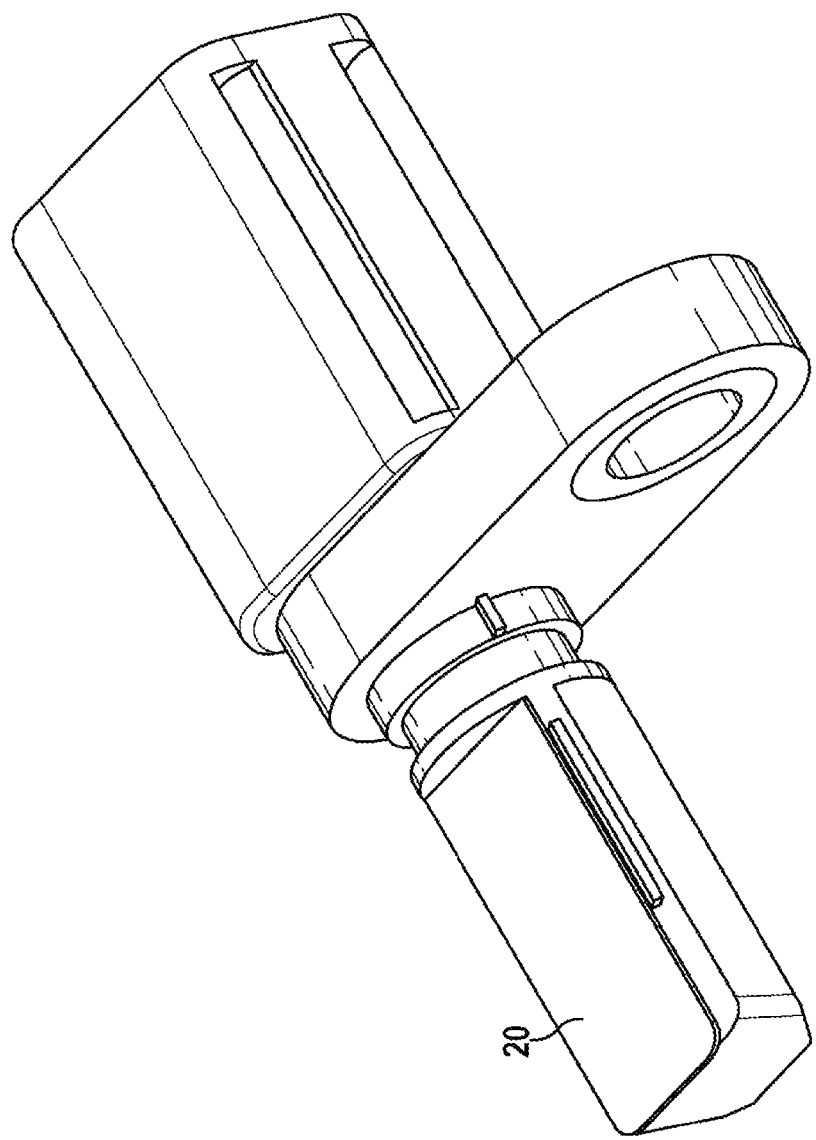
FIG. 6 shows a sensor arrangement having a covering in the form of a film.

In an optional subsequent step 309, a covering 6 can be applied onto the holder 2 in order to cover the interior 4, which is at least partially filled with silicone. FIG. 6 shows a sensor 1, which has a covering 20 as described in step 309.

Such a covering 6 protects the sensor, in particular the filling compound—in this example the silicone—against weather influences such as dirt or water and against mechanical effects, which could damage the filling compound and consequently could reduce the sealing function thereof. Such a covering 6 can be applied in the form of a film. Such a film can be secured on the holder 2, for example, by way of ultrasonic welding or by adhesive bonding.

Further manufacturing steps are not described in more detail but are possible, such as, for example, the application of a fastening component 7 having a bushing 8 or else the additional introduction of a magnet into the holder 2, which may be necessary depending on the measurement principle used (Hall effect, AMR, GMR).

The sensor 1 described here has been described in this embodiment as rectangular, with a front wall, rear wall, side wall and base, and corresponding separators and openings. Other geometric shapes are also possible, wherein the elements can then be assigned analogously. A cylindrical sensor also has, for example, a side face, and a front wall and rear wall. Only the positioning of the separators has to be adapted, where applicable.

The invention claimed is:

1. A sensor arrangement, comprising:
   a sensor element having at least two connector elements;
   at least two plug contacts;
   at least two connecting elements electrically connecting the at least two connector elements to the at least two plug contacts;
   a holder component in which the sensor element and the at least two plug contacts are arranged, the holder component comprising:
      a plurality of walls defining an interior of the holder component, the plurality of walls defining an open side of the interior;
      at least one spacing element arranged in the interior and extending from at least one wall of the plurality of walls, the at least one spacing element spacing the at least two connecting elements apart from the at least one wall; and
      at least one separator element arranged in the interior, the at least one separator element spacing the at least two connecting elements apart from one another,
   wherein the at least two connecting elements contact the at least two connector elements and the at least two plug contacts on a side of the at least two connector elements and the at least two plug contacts that faces towards the open side.

2. The sensor arrangement as claimed in claim 1, wherein the holder component and the at least one spacing element and the at least one separator element are in one piece.

3. The sensor arrangement as claimed in claim 1, wherein the at least two plug contacts are mechanically connected to a plug component and are introduced into the interior of the holder component through an opening defined in a further wall of the plurality of walls.

4. The sensor arrangement as claimed in claim 3, wherein the at least two plug contacts are introduced into the interior through positioning of the plug component and the holder component with respect to one another.

5. The sensor arrangement as claimed in claim 4, wherein:
   the at least two connector elements and the at least two plug contacts are offset relative to one another in a direction defined toward the open side within the holder component,
   the at least two connecting elements compensate for the offset,
   the at least two connecting elements are led through the at least one spacing element and the at least one separator element, at least partially, along the offset.

6. The sensor arrangement as claimed in claim 4, wherein the plug component is connected to the holder component such that the introduced at least two plug contacts are secured in the interior of the holder component.

7. A method for producing a sensor arrangement, the method comprising:
producing a plug component comprising at least two plug contacts;
producing a holder component having:
a receptacle for the at least two plug contacts of the plug component,
a further receptacle for a sensor element having at least two connector elements,
at least one spacing element extending from at least one wall of the holder component, and
at least one separator element; and
positioning the holder component and the plug component with respect to one another so as to introduce the at least two plug contacts into an interior of the holder component; and
after introducing the at least two plug contacts into the interior, electrically connecting at least two connecting elements to the at least two connector elements and to the at least two plug contacts in such a way that the at least two connecting elements are spaced apart from the at least one wall by the at least one spacing element and spaced apart from one another by the at least one separator element.

8. The method as claimed in claim 7, further comprising:
prior to electrically connecting the at least two connector elements to the at least two plug contacts, securing the holder component and the plug component such that a position of the at least two plug contacts is fixed in the interior of the holder component.

9. The method as claimed in claim 8, further comprising:
introducing the sensor element into the holder component so as to position the at least two connector elements of the sensor element in the holder component.

10. The method as claimed in claim 9, wherein the electrical connecting of the at least two connector elements to the at least two plug contacts that are secured in the holder element comprises:
inserting the at least two connecting elements into the holder component;
positioning the at least two connecting elements in the holder component with the at least one spacing element and separating the at least two connecting elements with the at least one separator element; and
electrically conductively connecting the at least two connecting elements to the at least two connector elements and to the at least two plug contacts.

11. The method as claimed in claim 10, further comprising:
filling the interior of the holder component with a sealing compound such that the sealing compound encloses in sealing fashion at least the sensor element having the at least two connector elements, the at least two plug contacts, at least at a contact-connection region with respect to the at least two connecting elements, and the at least two connecting elements.

12. The method as claimed in claim 11, wherein the sealing compound seals a passage opening of the holder component through which the plug contacts enter the interior.

13. The method as claimed in claim 11, further comprising:
applying a protective film onto the holder component so as to at least partially cover the sealing compound.

14. The method as claimed in claim 10, wherein:
the at least two connecting elements are elastically flexible, and
the insertion of the at least two connecting elements into the holder component comprises adapt a shape of the at least two connecting elements to an offset of the at least two connector elements and the at least two plug contacts in the holder component.

15. The method as claimed in claim 14, wherein the shape of the flexible at least two connecting elements is influenced during the insertion by the at least one spacing element and/or the at least one separator element.

16. A sensor arrangement, comprising:
a sensor element having at least two connector elements;
at least two plug contacts;
at least two connecting elements electrically connecting the at least two connector elements to the at least two plug contacts; and
a holder component in which the sensor element and the at least two plug contacts are arranged, wherein:
at least one spacing element is formed on the holder component extending from at least one wall of the holder component,
at least one separator element is formed on the holder component,
the at least two connecting elements are configured to be spaced apart in relation to the at least one wall by the at least one spacing element, and the at least two connecting elements are configured to be spaced apart from one another by the at least one separator element,
the at least two connector elements and the at least two plug contacts are offset relative to one another within the holder component in a direction toward an open end of the holder component,
the at least two connecting elements compensate for the offset, and
the at least two connecting elements are led through the at least one spacing element and the at least one separator element, at least partially, along the offset.

17. A method for producing a sensor arrangement, the method comprising:
positioning a holder component, which includes (i) a receptacle for at least two plug contacts, (ii) a further receptacle for a sensor element, at least one spacing element extending from at least one wall of the holder component, and (iv) at least one separator element, and a plug component comprising the at least two plug contacts with respect to one another so as to introduce the at least two plug contacts into an interior of the holder component;
electrically connecting at least two connector elements of the sensor element to the at least two plug contacts with at least two connecting elements in such a way that the at least two connecting elements are spaced apart from the at least one wall by the at least one spacing element and are spaced apart from one another by the at least one separator element,
wherein:
the at least two connector elements and the at least two plug contacts are offset relative to one another within the holder component in a direction toward an open end of the holder component,
the at least two connecting elements compensate for the offset, and the at least two connecting elements are led through the at least one spacing element and the at least one separator element, at least partially, along the offset.

* * * * *

UNITED STATES PATENT AND TRADEMARK OFFICE
CERTIFICATE OF CORRECTION

PATENT NO. : 10,900,817 B2
APPLICATION NO. : 16/309515
DATED : January 26, 2021
INVENTOR(S) : Fleischer et al.

Page 1 of 1

It is certified that error appears in the above-identified patent and that said Letters Patent is hereby corrected as shown below:

In the Claims

In Claim 17, at Column 10, Lines 47-48: "element, at least one spacing element" should read --element, (iii) at least one spacing element--.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*